United States Patent
Roxby et al.

(10) Patent No.: US 6,533,181 B1
(45) Date of Patent: Mar. 18, 2003

(54) DIRECT MARKING OF PARTS WITH ENCODED SYMBOLOGY METHOD, APPARATUS AND SYMBOLODY

(75) Inventors: Donald L. Roxby, Gurley, AL (US); Stephanie Mann, Albertville, AL (US)

(73) Assignee: Roboric Vision Systems, Inc., Canton, MA (US)

( * ) Notice: Subject to any disclaimer, the term of this patent is extended or adjusted under 35 U.S.C. 154(b) by 82 days.

(21) Appl. No.: 09/620,541

(22) Filed: Jul. 22, 2000

(51) Int. Cl.⁷ .................................................. G06K 7/10
(52) U.S. Cl. .................................. 235/494; 235/462.01
(58) Field of Search .................................. 235/486, 492, 235/494, 487, 456, 462.01, 472.01, 454, 455, 435

(56) References Cited

U.S. PATENT DOCUMENTS

| | | | | |
|---|---|---|---|---|
| 3,585,366 A | * | 6/1971 | Kern .......................... | 235/61.11 |
| 4,924,078 A | * | 5/1990 | Sant'Anselmo et al. .... | 235/494 |
| 5,126,542 A | * | 6/1992 | Priddy et al. ................ | 235/456 |
| 5,202,552 A | * | 4/1993 | Little et al. .................. | 235/494 |
| 5,204,515 A | * | 4/1993 | Yoshida ....................... | 235/456 |
| 5,288,986 A | * | 2/1994 | Pine et al. .................... | 235/494 |
| 5,324,923 A | * | 6/1994 | Cymbalski et al. .......... | 235/454 |
| 5,329,107 A | * | 7/1994 | Priddy et al. ................ | 235/494 |
| 5,343,031 A | * | 8/1994 | Yoshida ....................... | 235/494 |
| 5,410,620 A | * | 4/1995 | Yoshida ....................... | 382/61 |
| 5,464,974 A | * | 11/1995 | Priddy et al. ................ | 235/494 |
| 5,468,953 A | * | 11/1995 | Priddy et al. ................ | 235/494 |
| 5,538,674 A | * | 7/1996 | Nisper et al. ................ | 264/1.31 |
| 5,591,956 A | * | 1/1997 | Longacre, Jr. et al. ...... | 235/494 |
| 5,686,718 A | * | 11/1997 | Iwai et al. .................... | 235/494 |
| 5,726,435 A | * | 3/1998 | Hara et al. ................... | 235/494 |
| 5,856,661 A | * | 1/1999 | Finkelstein et al. ......... | 235/487 |
| 5,888,624 A | * | 3/1999 | Haghiri et al. .............. | 428/195 |
| 5,965,867 A | * | 10/1999 | Haghiri-Tehrani .......... | 235/492 |
| 6,025,997 A | * | 2/2000 | Huber et al. ................. | 361/777 |
| 6,164,552 A | * | 12/2000 | Sato ............................. | 235/494 |
| 6,176,430 B1 | * | 1/2001 | Finkelstein et al. ......... | 235/487 |
| 6,176,431 B1 | * | 1/2001 | Hoppe et al. ................ | 235/487 |
| 6,239,976 B1 | * | 5/2001 | Templeton et al. ......... | 361/737 |
| 6,306,975 B1 | * | 10/2001 | Zhao et al. .................. | 525/276 |

* cited by examiner

*Primary Examiner*—Thien M. Le
(74) *Attorney, Agent, or Firm*—Morris I. Pollack (57) ABSTRACT

The present invention describes an automated method for creating impressions of machine-readable encoded symbology using thermojet type solid object printing technology. This is accomplished by electronically transmitting a software file containing a part identification symbol representation in Computer Assisted Drawing (CAD) software format to a ThermoJet™ type solid object printer where tiny droplets of a wax like material are deposited in successive layers to form a three-dimensional pattern insert containing representations of the encoded symbology for combination with a pattern replica of a part to be encoded by said symbology. A casting mold is thereafter formed from the combined pattern and a casting is made from the mold to result in a machine readable 2D Data Matrix type encoded, directly marked, part.

12 Claims, 6 Drawing Sheets

DIRECT MARKING OF PARTS WITH ENCODED SYMBOLOGY METHOD, APPARATUS AND SYMBOLODY

BACKGROUND OF THE INVENTION—FIELD OF USE

This invention relates to parts identification, and more particularly, to direct part marking with encoded symbology.

BACKGROUND OF THE INVENTION— DESCRIPTION OF THE PRIOR ART

Industry utilizes part identification markings to relate parts and components to their respective histories. A wide range of marking methods has been developed for this purpose including means to apply to the part, machine-readable symbols or symbology of the type used for automatic data collection. Such symbology may include alpha-numeric characters, bar codes, stacked bar codes and/or 2D codes.

Available marking methods involve the use of attaching to a part, identification means; such as adhesive backed labels, tapes, bands, tags, identification plates or the like. Such marking methods may also include direct part markings (DPM), applied to, or formed by altering, a parts surface; such as shown and described in U. S. Pat. No. 1,561,427 issued on Nov. 19, 1925 to C. T. Forsberg for "Method And Means For Marking Castings". Parts, as broadly referred to, may include an entire product, and/or the constituent assemblies, sub-assemblies and the individual component parts of the product.

DPM is generally recommended in applications where: 1) traceability is required after the part is separated from a temporary identification, such as marked packaging; 2) the part is too small to be marked with symbology coded labels or tags; or 3) the part is subjected to environmental conditions that preclude the use of an attached identification means that will not survive those conditions.

DPM may generally be subdivided into two general categories: non-intrusive and intrusive.

Intrusive marking methods alter a parts surface by abrasion, cutting, burning, vaporizing or other destructive means. Intrusive marking methods include methods such as micro-abrasive blast, dot peening, electrochemical etch, machine engraving, milling, laser etching and engraving or other similar marking methods.

Non-intrusive markings, also know as additive markings, can be produced as part of the manufacturing process: such as the mold and cast of said U.S. Pat. No. 1,561,427; forging; or by adding a layer of media to a parts surface using methods that have no adverse effects on material properties of the part. Molding of patterns into parts is also shown and described in U.S. Pat. No. 3,627,861 issued to R. F. Timke on Dec. 14, 1971 for "Method Of Forming Indented Decorative Patterns On Ceramic Tiles".

Examples of additive marking could be ink jet, silk screen, stencil or other similar marking methods; such as shown and described in U.S. Pat. No. 5,144,330 issued on Sep. 1, 1992 to C. G. Bennett for "Method And Apparatus For Printing On Pipe" and U.S. Pat. No. 5,831,641 issued on Nov. 3, 1998 to R. G. Carlson for "Methods And Apparatus For Imprinting Indicia On A Three Dimensional Article" and in Defensive Publication T 909,002 published Apr. 3, 1973 for N. S. White, et al for "Identification Printer For Plastic Parts".

While both non-intrusive and intrusive marking methods are widely used in industry, their applications are limited. Non-intrusive markings are not generally used in applications associated with harsh environments. For instance, ink marking would not be used to mark engine components because the high heat experienced by the part would burn off the marking media. Intrusive markings, which were designed to survive harsh environments, are considered to be controlled defects in high stress applications and can degrade material properties beyond a point of acceptability.

Consequently, some intrusive markings, especially those done by lasers, are generally not used in safety critical applications without appropriate metallurgical testing and engineering approval. Safety critical applications include parts whose failure could result in hazardous conditions. Examples of safety critical applications are systems related to aircraft propulsion; vehicle control; equipment handling; high pressure; pyrotechnics and; nuclear, biological and chemical containment.

While it has been demonstrated that safe settings can be established through expensive and time consuming metallurgical testing, industry has never been conformable with this application because of the risk of input errors when entering settings. For example, an input error made during a turbine blade marking operation could result in the application of a marking that is applied with too much heat, resulting in micro-cracks that could propagate over time as the part is subjected to operational stresses. The aircraft industry has seen numerous situations where unknown defects in engine components have resulted in part failures leading to catastrophic engine loss. Many of these have involved flying debris that has been ingested by engines, penetrated cabins to strike passengers, punctured fuel tanks, cut control mechanisms and other damage. These incidents have often resulted in forced emergency landings or aircraft crashes involving fearful loss of life.

The aerospace industry especially requires methods to safely apply to parts, machine-readable encoded symbology that can withstand harsh environments. Many industry members currently utilize mold and cast techniques to create a part with raised or recessed characters representing part identification numbers (usually lot traceability). The impressions used to create the part identification characters are often stamped into molds using manual methods. While this process may have worked well for some industry members; it does not lend itself to automation.

With the recent release of Aircraft Transportation Association (ATA) Specification 2000, which requires the expanded use of machine-readable symbology markings, the aircraft industry has been looking for ways to automate the cast and mold marking process and to apply Data Matrix symbols to their parts and products.

Molding techniques utilizing wax molds are shown and described, by way of example, in U.S. Pat. No. 4,556,528 issued to H. M. Gersch et al on Dec. 3, 1985 for "Mold And Method For Casting Of Fragile And Complex Shapes" and U.S. Pat. No. 5,124,105 issued to J. Broughton et al on Jun. 23, 1992 for "Method Of Manufacturing A Wax Pattern Of A Bladed Rotor".

Numerous methods for cutting or embossing a representation of a Data Matrix symbol into a wax mold, however, have been tried without success. Stamp impression methods were found to deform wax molds in undesirable ways. That is to say, material displaced from an impression may likely be pressed into an adjacent impression or be raised upward to alter the surface contour of the part. Hot stamp methods have been known to fail because a practical device could not be developed that could provide the complex symbol structure or resolution required to the parts. Mechanical cutting devices have also been known to fail because the wax cuttings tend to stick to the cut surface and do not readily fall clear as they would when cutting a hard surface.

SUMMARY OF THE INVENTION

It is therefore an object of this invention to provide new and novel methods, apparatus and encoding symbology for direct part marking.

It is another object of this invention to provide new and novel apparatus and methods for casting encoded symbology directly into parts.

It is still another object of this invention to provide new and novel encoding symbology for casting directly into parts.

It is still another object of this invention to provide new and novel encoding symbology for forging directly into parts It is yet still another object of this invention to provide new and novel 2D encoding symbology for casting directly into parts.

It is yet still another object of this invention to provide new and novel 2D encoding symbology for forging directly into parts.

It is a further object of this invention to provide new and novel methods to automate existing manual part identification methods used in conjunction with mold and cast marking processes using ThermoJet™ type solid modeling technology.

It is still a further object of this invention to provide a new and novel software interface between Data Matrix type symbol generation software and ThermoJet™ type solid object printers to provides operators of same with the ability to add two-dimensional information (height or depth dimensions) to encoding symbology.

It is yet still a further object of this invention is provide new and novel formatting of Data Matrix™ type encoding symbols so that illumination generated shadows can be made to appear in marking recesses to provide contrast needed for optimal decoding of the symbols.

It is yet still a further object of this invention is to provide new and novel formatting of Data Matrix™ type encoding symbols so that illumination is reflected to or away from the reader lens by providing a difference in texture between the data cells and the substrate, said difference providing necessary contrast for optimal decoding of the symbols.

It is yet still a further object of this invention to provide means for the equipment operator to enter symbol carrier (insert or plug) selection information that includes both shape and size information for the encoding symbols.

It is yet still another object of this invention to provide new and novel means to convert encoding symbol generation information to a format that is recognized by CAD software used to drive ThermoJet™ type solid object printers.

It is yet still another object of this invention to provide new and novel means to simultaneously generate a reverse image insert that can be used to protect wax mold inserts while being inserted into parent product molds.

Other objects, features and advantages of the inventions in their methods, details of construction and arrangement of parts will be seen from the above, from the following description of the preferred embodiments when considered with the drawings and from the appended claims.

DESCRIPTION OF THE PREFERRED EMBODIMENTS

The preferred identification[symbol/symbology] marking for use with this invention is the two-dimensional (2-D) matrix symbol.

The 2-D matrix symbol/symbology was developed to overcome many of the deficiencies inherent in the first-generation (linear bar codes) and second-generation (stacked bar codes) symbol formats. One of the primary changes was the use of squares or rectangles, as a carrier of data in lieu of the strips of variable widths used in linear and stacked bar codes. The use of data elements of known size and shape makes the matrix code more versatile.

In the matrix code format, black data elements (cells) represent a binary "1" and white data elements (cells) represent a binary "0". When these binary values are used together in specific sequences, they represent alphanumeric characters.

Equal-sized data cells provide for an easier decoding logic decision process than for bar codes. By knowing the size and shape of a symbol and its individual data cells, decoding software can quickly reconstruct damaged portions of the code. Matrix symbols can be not only be produced in both square and rectangular format but they can also be scaled in size to fit into an available marking area.

Matrix codes, designed to be applied to any of a variety of articles, parts and products, are known and are described in detail, for example, in U.S. Pat. No. 4,939,354 (issued Jul. 3, 1990 to D. G. Priddy, et al.). A matrix code can store from one to 2335 alphanumeric characters in any language. An encoding scheme for use with such a symbol has a high degree of redundancy that permits most marking defects to be overcome. 16-bit cyclic redundancy check and data reconstruction capabilities are included in one version; and Reed-Solomon error correction is included in another. Up to 16 symbols can be concatenated. Error correction and checking (ECC) code 200 is preferred.

Figure 1:
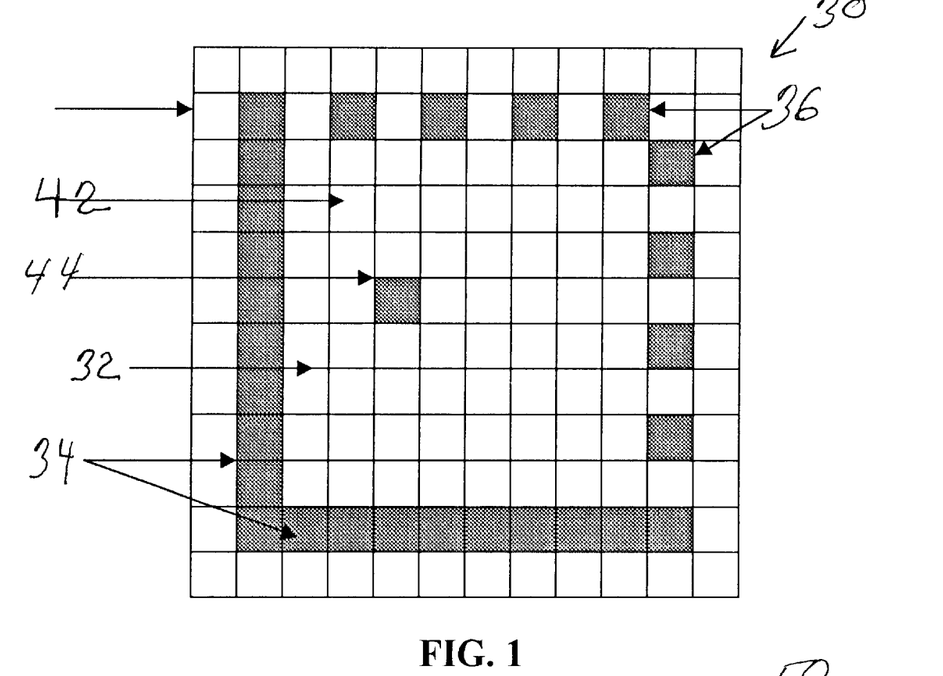
FIG. 1 illustrates the basic elements of a conventional matrix symbol.

The basic elements of a matrix symbol 30 are illustrated in FIG. 1. Although shown, for example, as a square, such matrix symbols may also be rectangular in configuration, and usually include a data storage field 32 disposed between either a solid border 34 or a broken border 36, or a combination of same, to facilitate location and decoding of the encoded data. White data cells 42 and black data cells 44 are arranged within data storage field 32, through known conventional methods, to provide encoded data, information and the like.

Figure 2:
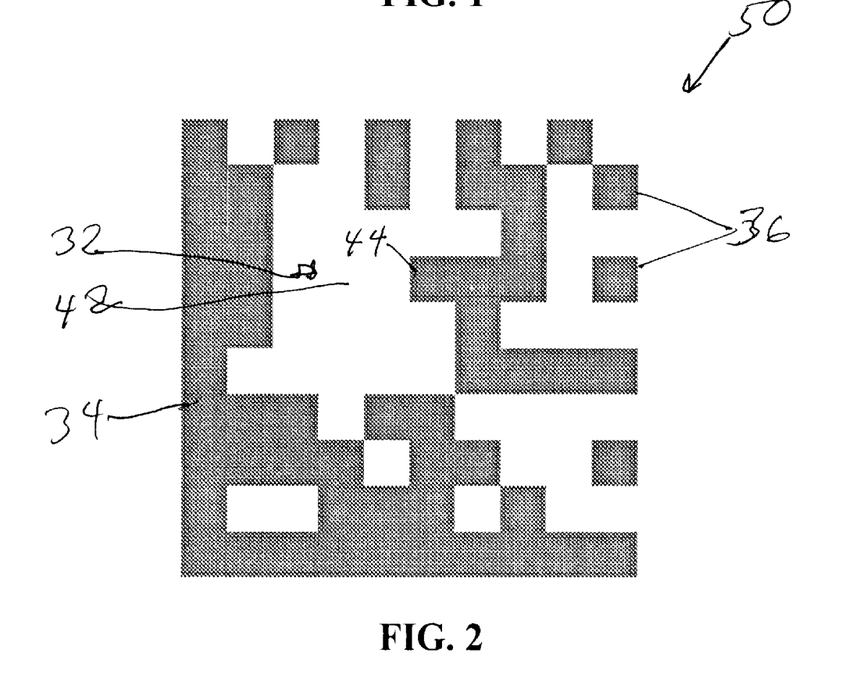
FIG. 2 illustrates the elements of a completed Data Matrix symbol.

FIG. 2 illustrates an example of a Data Matrix symbol 50, which has been placed in the public domain and has been recommended by the American National Standards Institute (ANSI) for use in direct part marking. Symbol 50 includes borders 34 and 36 defining enclosing data storage field 32 within which there is an arrangement of black cells and white cells 42 of symbol 50. Generally symbol 50 is applied to a carrier strip such as a pressure sensitive label or to the product label or its package.

In direct part marking, according to the instant invention, the machine readable-encoded symbol 70 (FIG. 3), carrying symbology 80, also incorporating the instant invention, is to be formed from the same material as the part. Encoded symbol 70 is not to be generated as an arrangement of black and white cells carried by a white substrate. The entire data storage field is a single color, the color of the part; and, as such, both the binary 1's 82 and the binary 0's 84 will also be the same color, the color of the part. Quite often the part itself is a shiny and silvery material; but materials of other colors may be required and utilized. A data storage field 86 is still provided and solid borders 88 and/or broken borders 90, or a combination thereof, may still be utilized. However, it should be noted that for symbology 80, of the instant invention, the binary 1 data cells 82 (illustrated in black to better describe the instant invention but which actually will be of the color of the part to be directly marked) are shown to be spaced one from the other by separations 93 for reasons to be hereinafter explained. Alternatively the binary 0 data cells could be the ones illustrated in black and spaced one from the other. The binary 1 and binary 0 data cells will be positioned, for decoding purposes in an imaginary grid arrangement 92, the lines for same appearing in FIG. 3 being shown to facilitate a better understanding of the instant invention.

Contrast between the binary 1 cells and binary 0 cells is required in order to decode a symbol. In some available direct part marking systems the cells occupying the binary 0 positions have to have a contrasting color applied to facilitate decoding. This adds cost and provides a situation where subjecting the so marked part to a harsh environment may destroy the contrasting color and thus make decoding impossible. Where dot peening has been used to directly mark a part contrast between the binary 1's and binary 0's is also required and coating the binary 0's [or 1's] with a contrasting color is still undesirable. The final dot peened symbol will have recessed cells and cells with an upper surface at the same level as the part surface. The depth of the recessed cells is generally limited because the underlying metal has to be compressed.

Projecting light at an angle to the symbol, such as a dot peened symbol, will, dependent upon the angle at which the illumination impinges upon the symbol, create shadows or glare in the dot-peened recesses. Such shadows or glare will provide a contrast between the observed recessed symbol surfaces and the adjacent unrecessed symbol surfaces. Because the recesses of a dot peened symbol are relatively shallow the shadow so created, or glare, may only cover or reflect from a relatively small area of the recess and decoding may very well be impossible or flawed.

Figures 3, 4, 5:
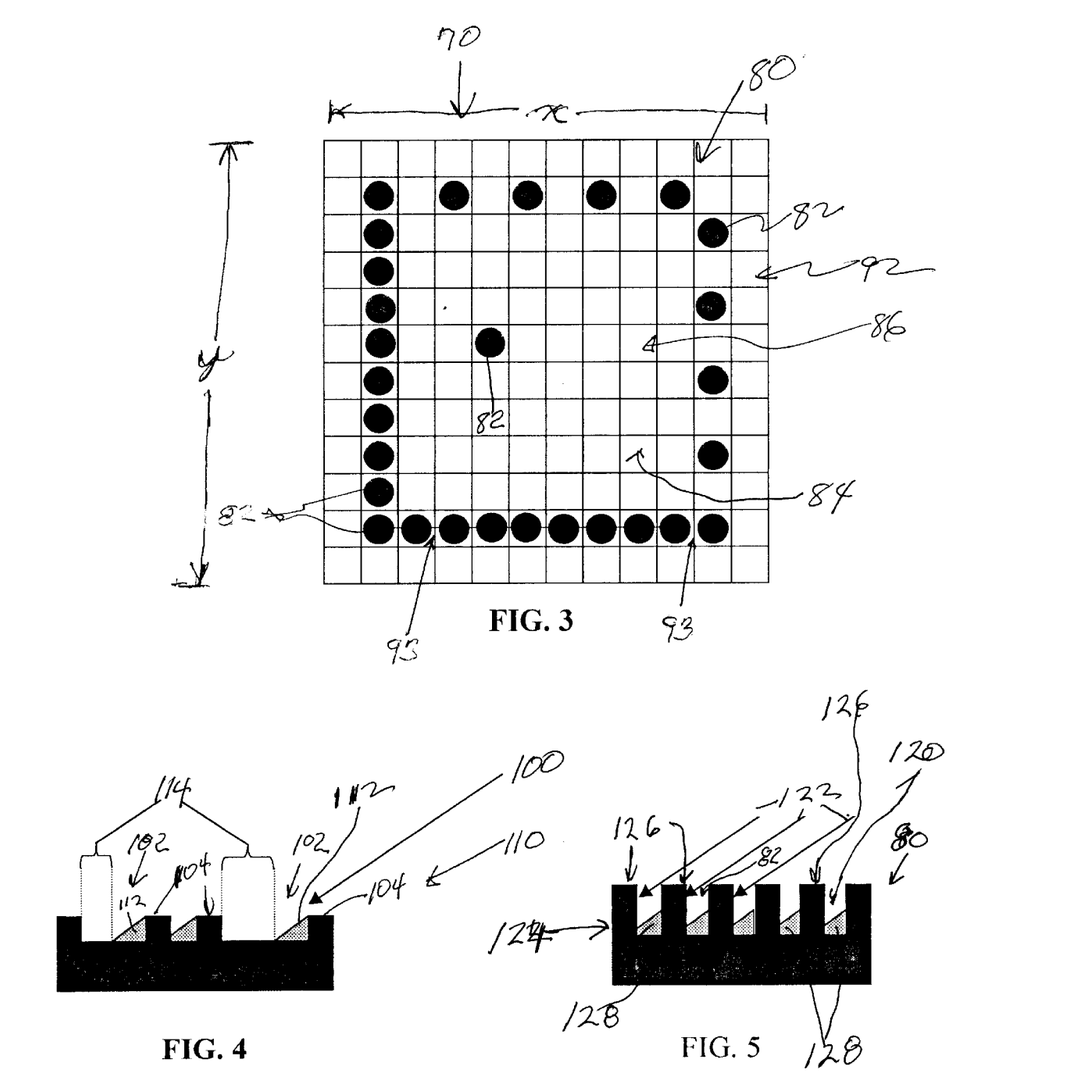
FIG. 3 illustrates a new and novel Data Matrix type symbol configuration incorporating the instant invention and used in conjunction with other aspects of the instant invention.
FIG. 4 schematically illustrates light projected onto prior-art Data Matrix symbols to provide light generated shadows within recesses of the symbol to create contrast for optimal decoding of the symbol.
FIG. 5 schematically illustrates light projected onto Data Matrix type symbols of this invention to provide shadows within recesses of the symbols to create contrast for optimal decoding of the symbol.

FIG. 4, by way of example, illustrates a portion 100 of an encoded symbol with recessed areas 102 separated by adjacent part material surfaces 104 of the symbol at the level of the part surface (not shown). If illumination 110 is projected towards the symbol, in an effort to create shadows of contrast 112, to facilitate symbol decoding, there will, however, remain recessed surface areas 114 where there are no shadows of contrast because of the relatively shallow recessed cells. Decoding of such a direct part marked symbol may therefore prove to be difficult, flawed or even impossible.

Symbology 80, as described above, utilizes recessed binary 1 cells 82 (illustrated as black in FIG. 3) that are spaced from each other by separations 93, which provide for creation of the shadows within the recessed cells 82, as will be hereinafter explained, to facilitate decoding of symbol 70. Separations 93 are, in this instance walls of the material of the part to be encoded. The shadows to be created provide sufficient contrast between the appearance of the upwardly facing recessed surfaces of the binary 1 encoded recessed data cells 82 and the appearance of adjacent upper surface areas of separating walls 93, the non-recessed binary 0 encoded data cells 84 (and/or of the non-encoded upwardly facing part surfaces), to facilitate such symbol decoding. It should also be noted that the binary 1 encoded recessed data cells 82 are of circular cross-sectional configuration and not of rectangular or square cross-sectional configuration. Other cross-sectional configurations, however, may be utilized for such recessed data cell encodings, even square and/or rectangular, as long as the recessed data cells are of equal size and are spaced, one from the other to provide for the shadow contrasting.

Symbology 80 (FIGS. 3 and 5) of the instant invention, employs relatively deep recesses 120 (FIG. 5) for the afore described data cell recesses 82, so that if illumination 122 is projected at a symbol 124 the adjacent separating wall surfaces 126, [and/or non-recessed cell surfaces] which are disposed at the level of the part surface (not shown) will cause shadows 128 to cover the lower surface of recesses 120. An efficient and accurate decoding of symbol 124 is therefore facilitated.

The present invention, by way of example, is hereinafter described in conjunction with an otherwise typical mold and cast process. Integrated into and associated with the mold and cast process of this invention is the use of ThemoJet™ type solid object printing technology which provides the user community with a means to interject automatic parts identification and data collection into part manufacturing functions with minimal cost or disruption of activities. While solid object printing technology described herein refers to ThermoJet and/or ThermoJet type it should be understood that other types of solid object printing may be utilized as long as such results in encoded symbol marked parts.

Figure 6:
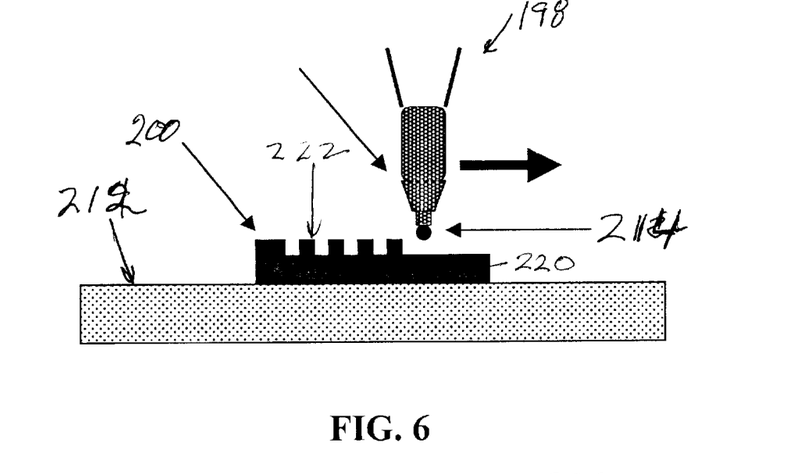
FIG. 6 schematically illustrates a ThemoJet™ type solid object print head, for utilizing new and novel software incorporating the instant invention to generate a new and novel Data Matrix type symbol insert incorporating the instant invention.
Figure 7:
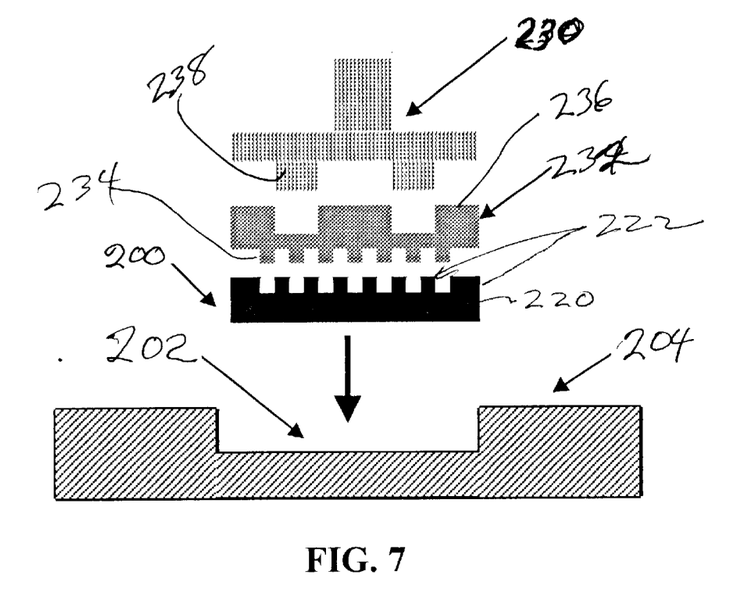
FIG. 7 schematically illustrates the Data Matrix type symbol insert of FIG. 6 being pressed into a wax product replica using an optional new and novel insert tool, incorporating the instant invention, with the combination of insert and replica being made according to the instant invention.

This invention contemplates the fabrication of a pattern insert or plug 200, shown in the process of being fabricated in FIG. 6 and completed in FIG. 7, sized to fit into a recessed area 202 (FIG. 7) formed in a replica 204 of the part or product (not shown) that is to be marked with encoded symbology. Insert 200 is fabricated, according to the instant invention, to carry a representation of a data matrix type symbol 206 (FIGS. 6 & 7) encoded, through conventional apparatus, with information or data pertinent to the part to be so marked.

A ThemoJet™ type solid object printer 198 (FIG. 6), with its software, modified to incorporate the instant invention as will be hereinafter described, is employed in the fabrication of insert 200. FIG. 7 shows only the piezo-electric print head 210 of printer 198. Print head 210, under control of printer 198, sweeps back and forth over a work surface 212 (FIG. 6) and sprays tiny droplets 214 of pattern material, in this instance a paraffin-based thermopolymer or the like, over work surface 212 to form the solid, three-dimensional part identification insert 200 (FIGS. 6 & 7). Insert 200 includes a base portion 220 with an encoded data markings portion 222 built thereupon.

The formation of markings portion 222 is accomplished by entering the desired product identification data into a conventionally available data encode software package to create the instructions required to generate a planar type 2-D Matrix type symbol, such as that shown in FIG. 2, but with data cells as shown and described for FIG. 3. This markings portion information is than transferred to an intermediate software package, incorporating the instant invention, where three-dimensional data: for the data cells (depth or height); insert dimensional data (area "x" and "y" —FIG. 3, and thickness—FIG. 6); and peripheral configuration data; are added into the intermediate software package to create the instructions required to generate insert 200. The resulting intermediate software package data is then converted to a software format that is recognized by the solid modeling CAD program that creates the data for printer 198; which is then set into operation to control and direct creation of insert(s) 200.

A standard symbol configuration can be produced in application where backfilling, to produce contrast for decoding, is allowed. Symbols, such as shown in FIG. 3, are created using round holes that are sized so that they do not touch. This approach is used where backfilling is not desirable and results in a marking that can be illuminated to produce shadows in the recesses to provide the contrast necessary for successful decoding, all as described hereinabove.

It should be understood that while the binary 1 data cells (shown in black in FIG. 3) have been shown with peripheral circular cross-sectional configurations that other peripheral cross-sectional configurations (such as, for example, square, rectangular, triangular, etc.) may also be utilized as long as there are separation spaces around same; and that the binary 0 cells may be formed as described for the binary 1 cells with the corresponding binary 1 cells formed as the aforedescribed binary 0 cells. In addition, while symbol 70 (FIG. 3) and insert 200 have been shown and described as having substantially square configurations they may just as well have other configurations; such as rectangular, circular, triangular, etc. or combinations thereof Pattern insert 200 (FIGS. 6–8), after being fabricated as described above, is inserted into recessed area 202 (FIGS. 7 & 8) of pattern replica 204 of the desired part or product which may be, for example, an aircraft engine turbine blade. An optional insert tool 230 (FIG. 7), made of plastic, metal or other rigid material, is pressed into an insertion plug 232, which is also fabricated by printer 198 in a manner such as described above for insert 200, but with an insert contact portion 234 fabricated in reverse format from encoded data markings portion 214 of insert 200 and with a tool contact portion 236 fabricated in reverse format from a plug contact portion 238 of insert plug 230. An insertion assembly 240, of tool 230 assembled with plug 232 and with its insert contact portion 234 positioned into markings portion 222 of insert 200, is than used to press part identification insert 200 into recess 202 of product replica 204 without deforming insert 200 and especially markings portion 222 thereof Other configurations of insert tools may also be utilized as long as they function to effect insertion of insert 200 into recess 202 of part replica 204.

Figure 8:
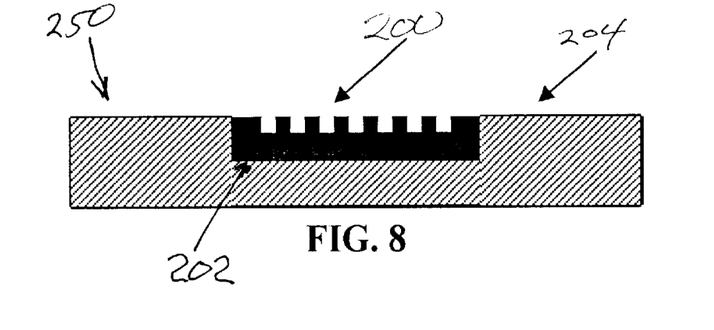
FIG. 8 schematically depicts the Data Matrix type symbol insert of FIG. 7 integrated with the wax product replica of FIG. 7 so that a surface of the symbol is flush with a surface of the product replica and forms therewith a symbology marked part replica for casting, incorporating the instant invention, fabricated according to the method, and utilizing the apparatus, of the instant invention.

A finished part replica/identification insert, pattern 250 is shown in FIG. 8. It includes an identification insert pattern 200, fabricated as described hereinabove, pressed into recessed area 202 of part replica 204, which is also fabricated as described hereinabove.

Figure 9:
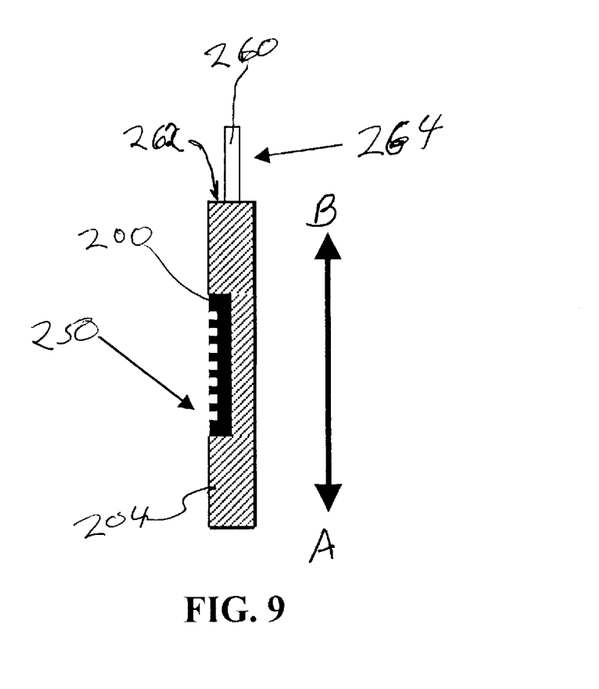
FIG. 9 shows the symbol marked part replica for casting of FIG. 8 with a wax sprue affixed thereto, the combination forming a symbol marked part casting pattern.

A sprue 260 (FIG. 9) is attached to pattern 250, at an end wall 262 thereof to form, with pattern 250, a completed mold forming pattern 264. Sprue 260 is fabricated in conventional configuration, such as, for example, a solid rod of selected circular cross-sectional diameter and of a selected length, and by conventional means. Other cross-sectional configurations may be utilized. Sprue 260 may be fabricated from the same pattern material as pattern 250 or other conventional pattern material that has a melting temperature similar to that of pattern 250.

Figure 10:
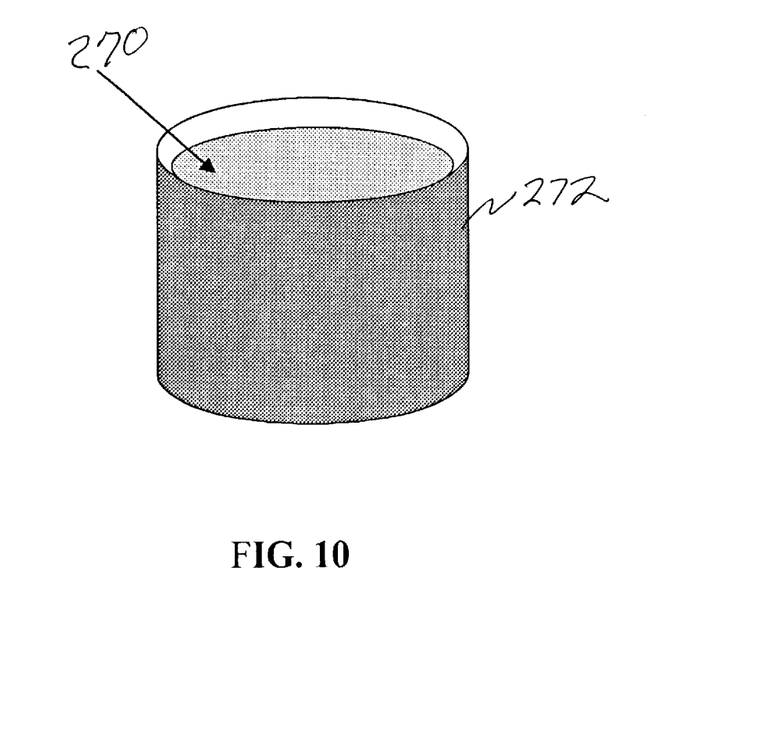
FIG. 10 schmatically illustrates a container of mold mixture.
Figure 11:
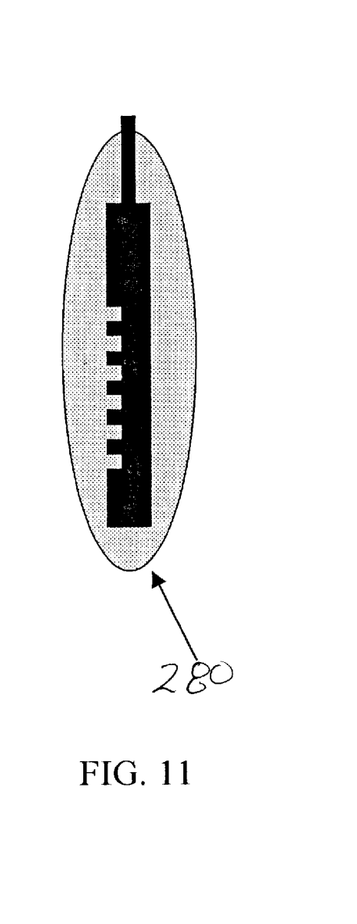
FIG. 11 shows the symbol marked part casting pattern of FIG. 9 encased, according to the instant invention, within a casting mold or shell.

The completed mold forming pattern 264 is thereafter repeatedly dipped into a ceramic mold forming slurry 270 (FIG. 10) contained in a slurry vat 272. Mold forming slurry 270 is of conventional composition for forming casting molds for the described fabrication method. It usually contains some refractory material. Successive dipping, withdrawing and redipping of pattern 264 into slurry 270, as by conventional manual or automated, dipping mechanism produces a ceramic casting mold 280 (FIG. 11) encasing pattern 264. The mold forming slurry 270 is selected to remain intact when subjected to a temperature to melt pattern 264, as will be described hereinafter, and when part casting material is poured into casting mold 280.

For high volume operations, a metal die (not shown) is made from a mold forming pattern, such as pattern 264, and so that the metal die can be used to form thousands of exactly duplicate casting patterns (not shown). The casting patterns are created by injecting a liquid wax, or a similar pattern forming material, into the metal die (casting cavity) where such pattern forming material is allowed to harden. Individual casting patterns are welded together by sprues, fabricated from the pattern forming material, to form chains of sprues that link the casting patterns so that molten casting material (metal plastic or similar molten material appropriate for castings) can flow between the casting patterns during the casting process to increase efficiency.

Casting mold 280, with mold forming pattern 264 still encased therein, is cured in a conventional manner and by conventional apparatus (not shown). The so cured casting mold 280 with pattern 264 is thereafter placed in and heated by a furnace or steam autoclave 290 to melt mold forming pattern 264, with its part identification insert 200, from casting mold 280 and leave in place thereof a casting cavity 292 within casting mold 280. A collection device 294, provided within furnace 290 receives the melted pattern forming material 296 as it melts and flows through a sprue opening 298 formed as molding sprue 260 melts. Casting molds 280 may be placed in and removed from the curing equipment and/or furnace 290 manually or by conventional automated conveying equipment (not shown) which may or may not be computer controlled.

Casting mold 280, with pattern 264 melted from casting cavity 292, is heated and otherwise treated in conventional manner and by conventional equipment, to receive, through sprue opening 298 (FIG. 13), molten casting material 310 from a cauldron 312 of such molten casting material 310. Molten casting material 310 may be a metal, plastic or other suitable and appropriate material suitable for casting of parts and their encoded symbology. Melting of material 310 and subsequent handling and pouring of same into casting mold 280 is accomplished in conventional manner and by conventionally available and controlled equipment.

Figures 14, 15:
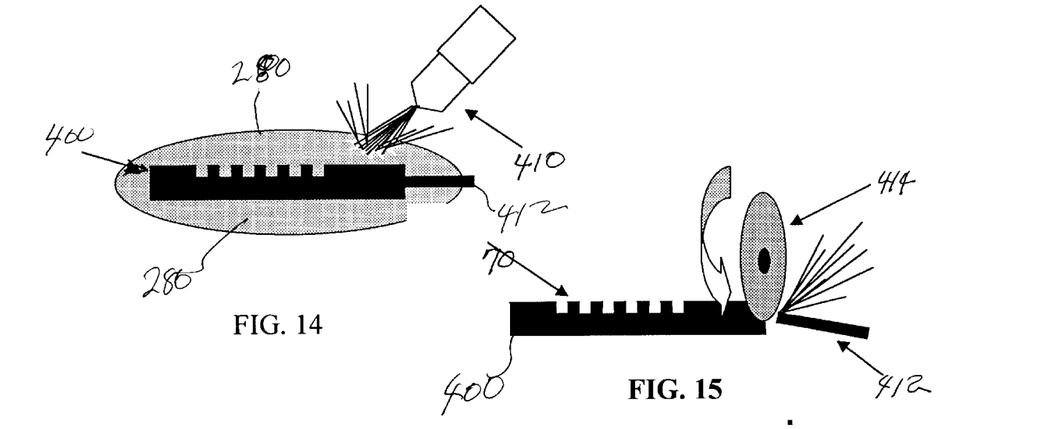
FIG. 14 illustrates the removal of the ceramic casting shell from the symbol marked metal part resulting from the process of FIG. 13 using an abrasive sprayer.
FIG. 15 depicts the removal of the sprue from the product of FIG. 14 using a cutting device.

A casting 400, of the intended part and carrying the selected 2D Data Matrix encoded symbol 70, is formed within casting cavity 292, of casting mold 280, when molten material 310 poured therein has cooled and solidified. Casting mold 280 is thereafter removed, in a conventional manner, as by using an abrasive blaster, or other similar and conventionally available device 410 (FIG. 14). A cast sprue 412 (FIGS. 14 & 15), formed, in conventional manner, during the casting process is cut from the completed part casting 400 by using an abrasive disc or plasma arc cutting device 414 (FIG. 15) in a conventional manner and by conventional equipment under conventional controls. Casting 400 may thereafater be conventionally polished and inspected for possible imperfections and symbol 70, carried thereby, read and verified to ensure marking quality using a conventionally available reader fitted with side lighting to cast shadows into the marking recesses as hereinabove described. The markings can be backfilled with a media of contrasting color to support reading with standard label readers.

Figures 16, 17, 18:
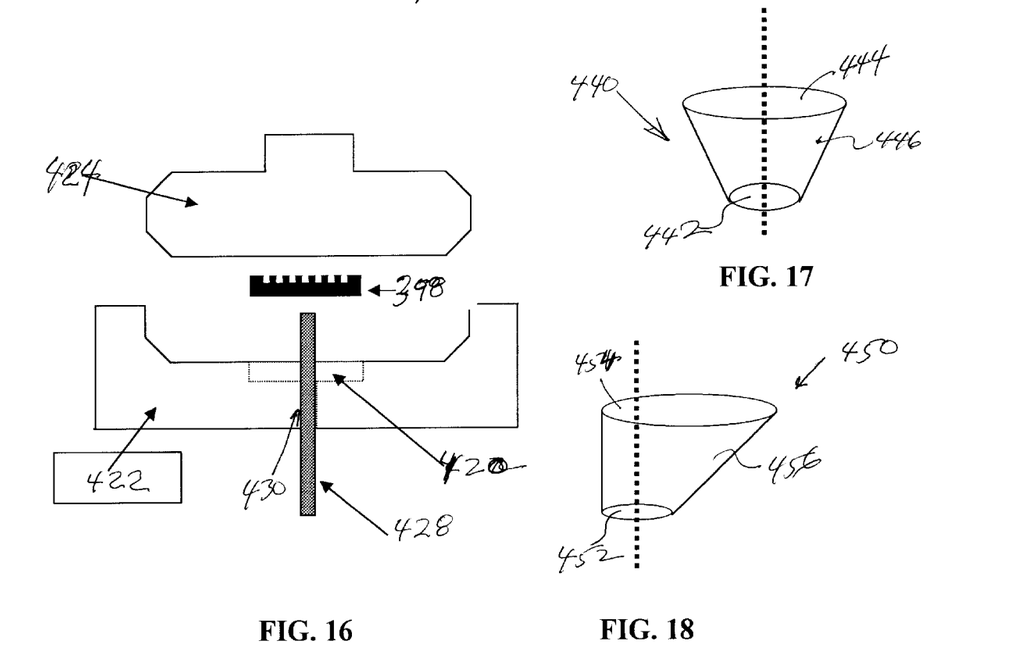
FIG. 16 illustrates how a finished symbol marked insert can be used in a typical forging process.
FIG. 17 schematically shows an alternative embodiment of data cell configuration incorporating the instant invention.
FIG. 18 schematically shows yet another alternative embodiment of data cell configuration incorporating the instant invention.

FIG. 16 illustrates how a completed insert 398 can be utilized to produce a Data Matrix symbol during a typical forging operation. In this application, insert 398 is pressed into a recess 420 formed a metallic mold 422. Hot metal is then forced into mold 422 by a press 424 to form a part 426 containing a 2D Data Matrix type identification symbol corresponding to the shape of insert 398. Insert 398 can be removed from mold 422 by using a rod shaped removal tool 428 that is inserted into an opening 430 in mold 422 to drive insert 398 out of recess 420 to facilitate replacement.

FIGS. 17 & 18 schematically illustrate new and novel embodiments of alternate data cell configurations, incorporating the instant invention, that facilitate preventing, or minimizing, entrapping air in the data cell recesses during casting operations; and which may also aid in evacuating such air bubbles during such casting operations.

Data cell recess 440 (FIG. 17) is configured with a bottom wall 442 of a first circular diameter and with an opening 444 of a second and larger circular diameter; said circular diameters being concentric one with respect to the other. A sloping side-wall 446 extends between bottom wall 442 and opening 444. As such recess 440 may be viewed to appear as an inverted truncated cone.

Data cell recess 450 (FIG. 18) is configured with a bottom wall 452 of a first circular diameter and with an opening 454 of a second and larger circular diameter; said circular diameters, however, are not concentric but instead opening 454 is skewed as shown in FIG. 18. A sloping and skewed side-wall 456 extends between bottom wall 452 and opening 454. AS such recess 450 may be viewed to appear as an inverted truncated and skewed cone.

Care is to be taken during casting operations for casting 400 (as described herein above) to ensure that air bubbles are not trapped in the data cell recesses, such as recesses 82 and 120 (FIG. 5). In such casting operations, where air bubbles are a problem, configuring the data cell shape with slopping side-walls, as shown by way of example for recesses 440 (FIG. 17) and 450 (FIG. 18) provides an escape path for otherwise entrapped air bubbles. Recessed opening patterns with a 1 to ½ ratio (surface opening larger then the bottom) as shown for the recesses in FIGS. 17 and 18 greatly reduces the possibility of air being trapped in the recesses. The side-wall angle can skewed to one side, a shown for recess 450 (FIG. 19) to provide additional shadowing when symbols are to be placed near structures that can block portions of the light projected onto the mark by the illumination source, Data cell recesses can also be filled with a thinner mixture of slurry prior to initiation of the normal production slurry bath operation as described above.

While data cell recesses of substantially circular cross-sectional inverted cone configurations have been shown and described it should be understood that recesses with other cross-sectional cone configurations (eliptical, rectangular, square, etc.) also may be utilized as long as the opening is larger in area then the bottom wall.

When a part and its encoded symbol are cast together as a unitary item the encoded symbol and its substrate are always the same material. Decoding of the encoded symbol is difficult, if not impossible, unless there is some contrast between the illumination reflected from the surface of the symbols data cells and the surface of the substrate, or base, upon which the data cells are arranged. Decoding of such a symbol is, however, made possible be altering the way that light is reflected off of the respective surfaces so that a contrast there between is created. The illumination source can be adjusted to cast shadows into recesses, as described above with respect to FIG. 5, or be deflected off a surface so as to strike or miss the reader lens, as will be hereinafter described.

Figures 12, 13, 19:
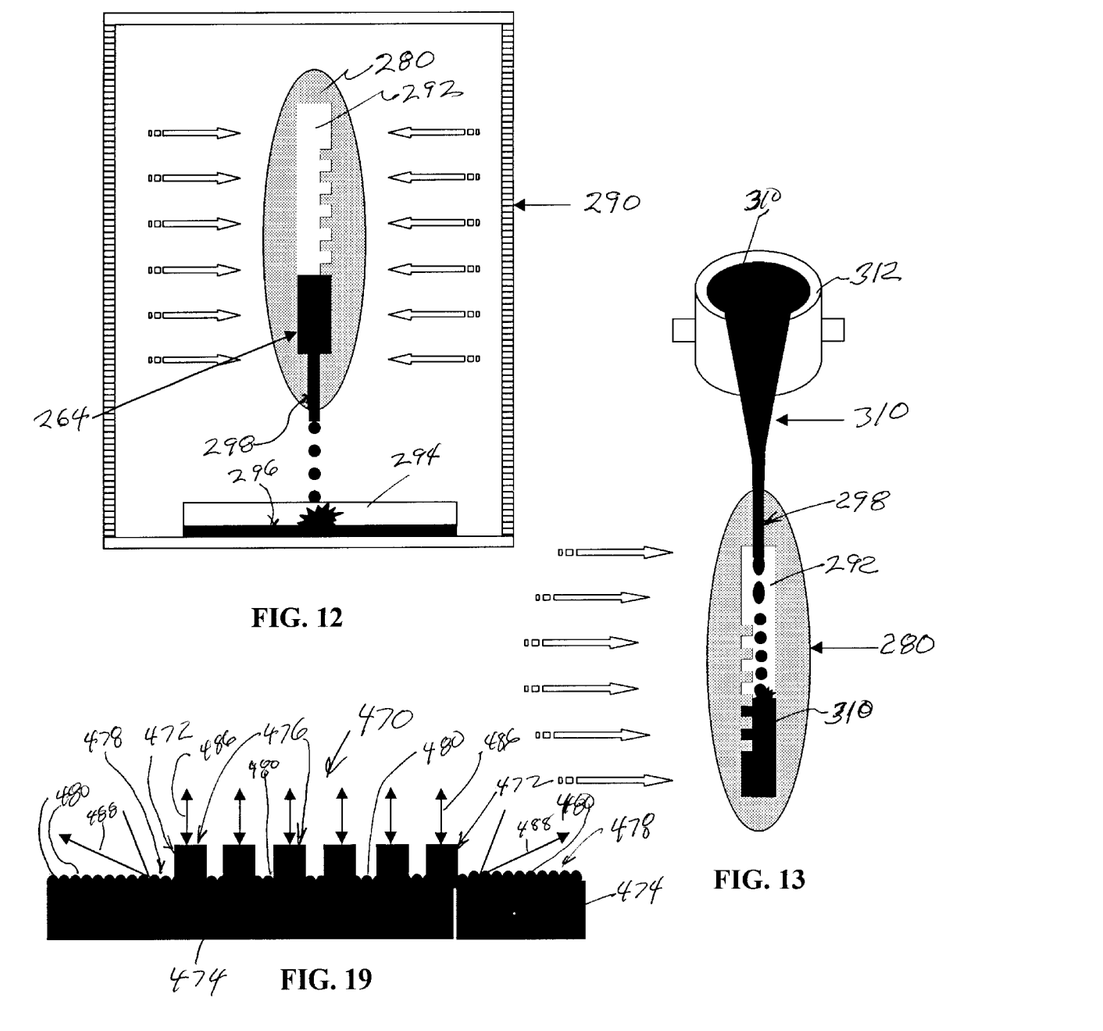
FIG. 12 depicts the casting shell of FIG. 11 being heated to melt the wax symbol marked part casting pattern from the casting shell.
FIG. 13 illustrates the casting shell resulting from the melting action in FIG. 12 being filled with molten metal to form a completed part.
FIG. 19 schematically illustrates yet another new and novel Data Matrix type insert incorporating the instant invention, and further illustrates light projected onto the Data Matrix type symbols of this invention that is reflected away from the reader lens to create contrast for optimal decoding of the symbol.

In the embodiment of FIG. 19, there is shown an illustration of an insert portion 470 of a casting of a part (not shown) with encoded data cells 472 extending upwardly from a base 474. An upper surface 476 of encoded data cells 472 remains relatively smooth from the casting process, such as that described above. Surfaces 476 may also be otherwise finished to be smooth. Alternatively an upper surface 478 of base 474 is roughened as by casting same with an array of bump like items 480. The substrate surface between data cells 476 may also carry bump like items 480. A difference in texture is thus created between surface 476 of the symbol's data cells 472 and the substrate 476 upon which they are arranged and decoding of the data cells can therefore be efficiently and accurately accomplished. Light, from a conventional light source (not shown) can be projected along lines 486 towards insert 470 to impinge upon surfaces 476 and, because such surfaces are relatively smooth, be reflected back along those same lines 486 to data cell imaging and decoding devices (not shown) of conventional construction and operation. Light impinging upon bums 490 will, however, be reflected along lines, such as lines 488 and as such will not be reflected back to the imaging and decoding device.

Effective and efficient imaging and decoding can thus be accomplished whether the data cell surfaces are rough or curved and the insert base or substrate surface is smooth or whether the data cell surfaces are smooth and the insert base or substrate surface is rough or textured. Such differentiation between data cell and insert base surfaces can be accomplished with both raised or recessed data cells and thus provide the user with four possible options to facilitate imaging and decoding of the symbol.

Numerous alterations of the inventions herein disclosed will suggest themselves to those skilled in the art. However, it is to be understood that the present disclosure relates to the preferred embodiments of the invention, which is for purposes of illustration only, and not to be construed as a limitation of the invention. All such modifications, which do not depart from the spirit of the invention, are intended to be included within the scope of the appended clams.

From the above description it will thus be seen that there has been provided new, novel and improved encoded symbology data cells, and apparatuses and methods for direct part marking (DFPM) of castings with encoded symbols and to facilitate efficient and effective decoding of such direct part marked symbols.

It is understood that although there has been shown and described preferred embodiments of the invention that various modifications may be made in details thereof without departing from the spirit as comprehended by the following claims.

What is claimed is:

1. A process for applying encoded symbology to a part so as to be integral therewith during the manufacture of the part, comprising:
    (a) forming a part replica pattern from a pattern material having a pattern material melting temperature, and so as to include as part of said part replica pattern machine readable encoded symbology;
    (b) including with said part replica pattern, during the formation thereof, at least one pattern sprue extending out from said part replica pattern;
    (c) encasing said part replica pattern, and said at least one pattern sprue, in a casting mold fabricated from a mold material having a melting temperature that is higher then said pattern material melting temperature;
    (d) forming a casting cavity for a part with encoded symbology within said casting mold by subjecting said mold encased part replica pattern with said at least one pattern sprue to a melting temperature sufficient to melt said part replica pattern with said at least one pattern sprue so that said pattern material flows from said encasing mold through at least one sprue opening formed through said encasing mold as said at least one pattern sprue so melts;
    (e) filling said casting cavity with casting material through said at least one sprue opening to form a cast part with integral encoded symbology; and
    (f) seperating said mold and casting.

2. The process of claim 1, including:
    (a) forming said machine readable encoded symbology part of said part replica pattern as a machine readable encoded symbology pattern insert;
    (b) forming said said part replica pattern separate from said encoded symbology pattern insert; and
    (b) combining said part replica pattern and said pattern insert to form said part replica pattern with machine readable encoded symbology.

3. The process of claim 2 including forming said machine readable encoded symbology as a 2D Data Matrix type symbol.

4. The process of claim 3, including:
    (a) forming said 2D Data Matrix type symbol with binary 1 representing data cells and binary 0 representing data cells disposed in an array to create said symbol; and
    (b) forming said binary 1 representing data cells as inwardly extending recesses.

5. The process of claim 4, including spacing adjacent binary 1 data cells from each other by separating walls.

6. The process of claim 5, including forming said data cell recesses to a predetermined depth such that when light is directed at a predetermined angle towards said data cells said separating walls create shadows which cover bottom walls of said recesses.

7. The process of claim 6, including forming bottom surfaces of said binary 1 representing recesses and surfaces representing binary 0's so that when light impinges upon such surfaces there is a contrast in reflected light between said binary 1's and binary 0's.

8. The process of claim 3, including:
    (a) forming said 2D Data Matrix type symbol with binary 1 representing data cells and binary 0 representing data cells disposed in an array to create said symbol; and
    (b) forming said binary 1 representing data cells as outwardly extending projections.

9. The process of claim 8, including spacing adjacent binary 1 data cells from each other by separating channels.

10. The process of claim 9, including forming said data cell projections to a predetermined height such that when light t is directed at a predetermined angle towards said data cells they create shadows which cover bottom walls of said channels.

11. The process of claim 10, including forming upper surfaces of said binary 1 representing projections and surfaces representing binary 0's so that when light impinges upon such surfaces there is a contrast in reflected light between said binary 1's and binary 0's.

12. The process of claim 2, including forming said pattern insert by utilizing a ThermoJet type solid object printer that sprays said pattern forming material to first form a base portion for same and then form selected data cells by depositing said pattern forming material in selected positions upon said base portion and to a predetermined and selected height above said base portion.

* * * * *